US012784994B2

(12) United States Patent
Miyamoto et al.

(10) Patent No.: US 12,784,994 B2
(45) Date of Patent: Nov. 3, 2026

(54) SOLID ELECTROLYTIC CAPACITOR HAVING TWO OR MORE JUNCTIONS

(71) Applicant: Panasonic Intellectual Property Management Co., Ltd., Osaka (JP)

(72) Inventors: Fumiya Miyamoto, Osaka (JP); Katsuhisa Ishizaki, Kyoto (JP); Kojiro Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/694,622

(22) PCT Filed: Sep. 1, 2022

(86) PCT No.: PCT/JP2022/033014
§ 371 (c)(1),
(2) Date: Mar. 22, 2024

(87) PCT Pub. No.: WO2023/062961
PCT Pub. Date: Apr. 20, 2023

(65) Prior Publication Data

US 2024/0428998 A1 Dec. 26, 2024

(30) Foreign Application Priority Data

Oct. 14, 2021 (JP) ................................ 2021-169062

(51) Int. Cl.
*H01G 9/012* (2006.01)
*H01G 9/15* (2006.01)
*H01G 9/26* (2006.01)

(52) U.S. Cl.
CPC .............. *H01G 9/012* (2013.01); *H01G 9/15* (2013.01); *H01G 9/26* (2013.01)

(58) Field of Classification Search
None
See application file for complete search history.

(56) References Cited

U.S. PATENT DOCUMENTS 6,343,004 B1 1/2002 Kuranuki et al.
6,535,375 B1 * 3/2003 Jung ........................ H01G 9/26 361/523

(Continued)

FOREIGN PATENT DOCUMENTS

JP 2000-138138 5/2000
JP 2008-235412 A 10/2008

(Continued)

OTHER PUBLICATIONS

International Search Report of PCT application No. PCT/JP2022/033014 dated Nov. 15, 2022.

*Primary Examiner* — Eric W Thomas
(74) *Attorney, Agent, or Firm* — WHDA, LLP

(57) ABSTRACT

Provided is solid electrolytic capacitor 10 including: a plurality of capacitor elements 11 each having anode part 11*a* and cathode part 11*b*, capacitor elements 11 being stacked along first direction D1; and two or more junctions 16 each joining and electrically connecting the stacked anode parts, each of the two or more junctions extending along first direction D1. A difference L1–L2 is 3.8 mm or less, anode part 11*a* having a dimension L1 [mm] in third direction D3 perpendicular to each of the first direction and second direction D2 that is a direction from anode part 11*a* to cathode part 11*b*, two or more junctions 16 having a total dimension L2 [mm] of maximum diameters in third direction D3. A relationship of b≥a/2 holds, where a [mm] represents a maximum diameter of each of the two or more junctions 16 in third direction D3 in a predetermined cross section perpendicular to second direction D2 of capacitor element 11, and b [mm] represents a shortest distance (Continued)

between an end of anode part 11*a* and corresponding one of the two or more junctions 16 in third direction D3. This configuration enables improvement in joint quality of the anode part.

15 Claims, 7 Drawing Sheets

(56) References Cited

U.S. PATENT DOCUMENTS

| | | | | |
|---|---|---|---|---|
| 2003/0039093 | A1* | 2/2003 | Tadanobu | H01G 9/012 29/25.03 |
| 2008/0232027 | A1* | 9/2008 | Ozawa | H01G 9/14 361/311 |
| 2009/0067120 | A1* | 3/2009 | Matumoto | H01G 13/006 29/25.03 |
| 2010/0165547 | A1 | 7/2010 | Kuranuki et al. | |
| 2013/0222977 | A1 | 8/2013 | Kawahito et al. | |
| 2020/0082993 | A1* | 3/2020 | Wu | H01G 9/10 |

FOREIGN PATENT DOCUMENTS

| | | |
|---|---|---|
| JP | 2009-094474 | 4/2009 |
| JP | 2013-179143 | 9/2013 |

* cited by examiner

SOLID ELECTROLYTIC CAPACITOR HAVING TWO OR MORE JUNCTIONS

CROSS-REFERENCE TO RELATED APPLICATIONS

This application is a U.S. national stage application of the PCT International Application No. PCT/JP2022/033014 filed on Sep. 1, 2022, which claims the benefit of foreign priority of Japanese patent application No. 2021-169062 filed on Oct. 14, 2021, the contents all of which are incorporated herein by reference.

TECHNICAL FIELD

The present disclosure relates to a solid electrolytic capacitor.

BACKGROUND

A solid electrolytic capacitor including a plurality of capacitor elements each having an anode part and a cathode part, the plurality of capacitor elements being stacked on each other, have been conventionally known (e.g., Unexamined Japanese Patent Publication No 2013-179143). Unexamined Japanese Patent Publication No. 2013-179143 discloses a solid electrolytic capacitor in which stacked anode parts are welded to each other by laser irradiation.

SUMMARY

An aspect of the present disclosure relates to a solid electrolytic capacitor. The solid electrolytic capacitor includes a plurality of capacitor elements each having an anode part and a cathode part, the plurality of capacitor elements being stacked in a first direction, and two or more junctions each joining and electrically connecting [the] stacked anode parts including the anode part, each of the two or more junctions extending along the first direction. $L1-L2 \leq 3.8$ mm is satisfied, where L1 [mm] represents a dimension of the anode part in a third direction perpendicular to each of the first direction and a second direction that is a direction from the anode part to the cathode part, and L2 [mm] represents a total dimension of maximum diameters of the two or more junctions in the third direction. $b \geq a/2$ is satisfied, where a [mm] represents a maximum diameter of each of the two or more junctions in the third direction in a predetermined cross section of the plurality of capacitor elements, the predetermined cross section being perpendicular to the second direction, and b [mm] represents a shortest distance between an end of the anode part and corresponding one of the two or more junctions in the third direction.

The present disclosure enables to improve joint quality of an anode part.

Although novel features of the present invention are set forth in the appended claims, the present invention will be better understood by the following detailed description with the drawings, taken in conjunction with other objects and features of the present invention, both as to construction and content.

DESCRIPTION OF EMBODIMENT

Figure 1:
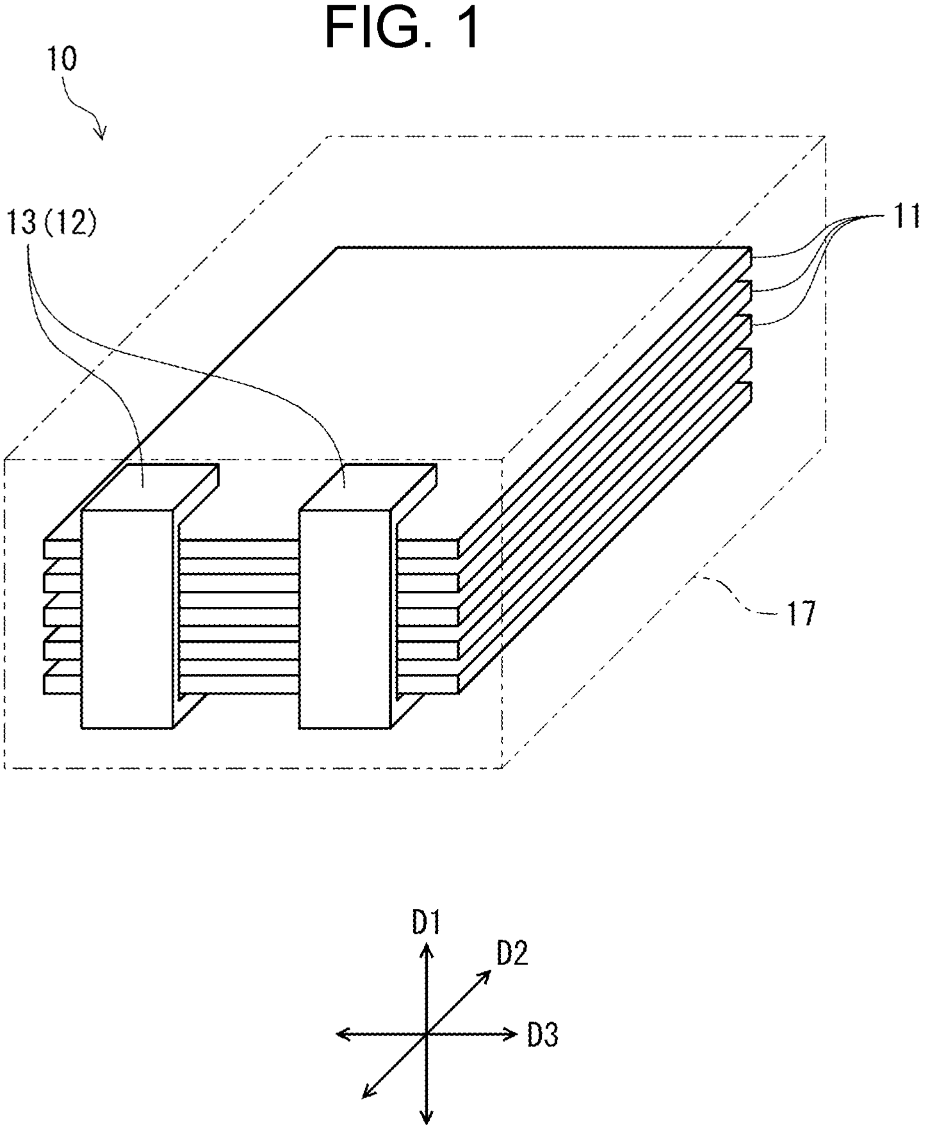
FIG. 1 is a perspective view schematically illustrating a solid electrolytic capacitor according to a first exemplary embodiment.

In recent years, the solid electrolytic capacitors have been required to be further downsized. Under such circumstances, the anode part of the capacitor element also tends to decrease in dimension. However, when the anode part decreases in size beyond a certain degree, deterioration in joint quality may occur by, for example, a spatter formed at an end of the anode part when the stacked anode parts are bonded to each other by laser welding. In such a situation, the present disclosure provides the solid electrolytic capacitor that can improve joint quality of an anode part.

A solid electrolytic capacitor according to the present disclosure includes a plurality of capacitor elements and two or more junctions.

The plurality of capacitor elements each have an anode part and a cathode part. The plurality of capacitor elements are stacked on each other in a first direction. Between the anode part and the cathode part, an insulating part may be provided to electrically insulate the anode part and the cathode part. The insulating part may be made of an insulating tape or an insulating resin, for example.

The anode part may be configured to include a part of an anode body, which is made of a valve metal, of the capacitor element (a part close to one side of the anode body with respect to the insulating part). The cathode part may include a solid electrolyte layer and a cathode layer sequentially formed on a surface of a cathode formation part, which is a remaining part of the anode body (a part close to the other side of the anode body with reference to the insulating part). A dielectric layer is provided between the anode body and the solid electrolyte layer.

Examples of the valve metal constituting the anode body include aluminum, tantalum, niobium, and titanium. The anode body may be foil of the valve metal or a porous sintered body made of the valve metal.

The dielectric layer is formed at least on the surface of the cathode formation part that is the remaining part of the anode body. The dielectric layer may be made of an oxide (e.g., aluminum oxide) formed on a surface of the anode body by anodizing or a gas phase method such as a vapor deposition.

The solid electrolyte layer is formed on a surface of the dielectric layer. The solid electrolyte layer may contain a conductive polymer. The solid electrolyte layer may further contain a dopant as necessary.

As the conductive polymer, a known polymer used for a solid electrolytic capacitor, such as a π-conjugated conductive polymer, may be used. Examples of the conductive polymer include polymers having polypyrrole, polythiophene, polyaniline, polyfuran, polyacetylene, polyphenylene, polyphenylene vinylene, polyacene, and polythiophene vinylene as a basic skeleton. Among these polymers, a polymer that adopts polypyrrole, polythiophene, or polyaniline as a basic skeleton is preferable. The above-mentioned polymers also include a homopolymer, a copolymer of two or more types of monomers, and derivatives of these polymers (a substitute having a substituent group). For example, polythiophene includes poly(3,4-ethylenedioxythiophene) and the like. As the conductive polymer, one type may be used alone, or two or more types may be used in combination.

As the dopant, at least one selected from a group consisting of a low molecular weight anion and a polyanion is used, for example. Examples of the anion include, but are not particularly limited to, a sulfate ion, a nitrate ion, a phosphate ion, a borate ion, an organic sulfonate ion, and a carboxylate ion. Examples of the dopant that generates sulfonate ions include benzenesulfonic acid, p-toluenesulfonic acid, and naphthalenesulfonic acid. Examples of the polyanion include a polymer-type polysulfonic acid and a polymer-type polycarboxylic acid. Examples of the polymer-type polysulfonic acid include a polyvinylsulfonic acid, a polystyrenesulfonic acid, a polyallylsulfonic acid, a polyacrylsulfonic acid, and a polymethacrylsulfonic acid. Examples of the polymer-type polycarboxylic acid include a polyacrylic acid and a polymethacrylic acid. The polyanion also includes a polyester sulfonic acid and a phenolsulfonic acid novolak resin. However, the polyanion is not limited to them.

The solid electrolyte layer may further contain a known additive agent and a known conductive material other than the conductive polymer as necessary. Examples of such a conductive material include at least one selected from the group consisting of conductive inorganic materials such as manganese dioxide and TCNQ complex salts.

The cathode layer may be composed of a carbon layer formed on the surface of the solid electrolyte layer and a conductor layer formed on a surface of the carbon layer. The conductor layer may be composed of a silver paste. As the silver paste, a composition containing silver particles and a resin component (binder resin) may be used, for example. As the resin component, a thermoplastic resin may be used, but it is preferable to use a thermosetting resin such as an imide resin or an epoxy resin.

The two or more junctions join and electrically connect the stacked anode parts. Each junction extends along the first direction. Each junction may be formed by laser welding, for example. The stacked anode parts may be irradiated with a laser on a first surface that is one outermost surface arranged in the first direction, or may be irradiated with a laser on a second surface that is the other outermost surface arranged in the first direction. The two or more junctions may be each formed by irradiating lasers in an identical direction or by irradiating lasers in different directions from each other.

The two or more junctions may be formed by the following method, for example. First, a plurality of capacitor elements are stacked in the first direction. Subsequently, a plurality of anode parts are caulked and temporarily fixed. Then, the temporarily fixed parts are irradiated with a laser to form two or more junctions that electrically and mechanically connect the stacked anode parts. As a method for temporarily fixing the plurality of anode parts, a method by cold crimping or a method using a needle for forming a through-hole can be considered, for example.

A direction from the anode part toward the cathode part is defined as a second direction, and a direction perpendicular to each of the second direction and the first direction is defined as a third direction. When the anode part has dimension L1 [mm] in the third direction and the two or more junctions have total dimension L2 [mm] of maximum diameters in the third direction, a difference L1−L2 is less than or equal to 3.8 mm (L1−L2≤3.8 mm). As described above, since the difference L1−L2 is very small in dimension, in other words, the capacitor element is very small, each junction formed without any measure may deteriorate joint quality of the anode parts due to a spatter formed at an end of each anode part, for example.

In contrast, in the solid electrolytic capacitor of the present disclosure, "b≥a/2" is satisfied, where "a" [mm] represents a maximum diameter of the junction in the third direction in a predetermined cross section of the capacitor element, which is perpendicular to the second direction, and "b" [mm] represents a shortest distance between an end of the anode part and the junction in the third direction. Here, the predetermined cross section may be a cross section at which the junction closest to the end of the anode part has a maximum diameter, or a cross section passing through the center of the junction, for example. When such a dimensional relationship is satisfied, shortest distance "b" between the end of the anode part and the junction can be secured sufficiently large. As a result, even when a dimensional difference L1−L2 is very small as described above, a spatter is less likely to be formed at the end of the anode part during formation of each junction, and thus enabling to improve joint quality of the anode part.

The dimension L1 of the anode part in the third direction may be less than or equal to 4.3 mm. Even when a capacitor element having such a small anode part is used, the present disclosure enables to improve joint quality of the anode part.

A maximum diameter of the junction closest to the end of the anode part may be less than or equal to 0.5 mm in the third direction. Even when the junction has a relatively large maximum diameter as described above, the present disclosure enables to improve joint quality of the anode part.

In the second direction, the center of the junction may be located closer to the cathode part than the center of the anode part. As a result, a sufficiently large distance between the end of the anode part and the junction in the second direction is secured. This configuration suppresses formation of a spatter during formation of the junction even at the end of the anode part in the second direction, and thus enabling further to improve joint quality of the anode part.

The solid electrolytic capacitor may include two junctions. The solid electrolytic capacitor may include only two junctions, for example.

The solid electrolytic capacitor may include three or more junctions. The stacked anode parts may have a first surface and a second surface. The first surface is one of outermost surfaces arranged in the first direction, and the second surface is another one of outermost surfaces arranged in the first direction. The three or more junctions may include a first junction having a first area on the first surface and a second junction having a second area smaller than the first area on the first surface. This configuration allows three or more junctions to exist, so that the distance between the end of the anode part and the junction is likely to decrease. In contrast, when the dimensional relationship (i.e., b≥a/2) according to the present disclosure is allowed to be satisfied, deterioration in joint quality of the anode part can be avoided.

As described above, the present disclosure enables to improve joint quality of an anode part in a solid electrolytic capacitor including a small capacitor element.

Hereinafter, an example of the solid electrolytic capacitor according to the present disclosure will be specifically described with reference to the drawings. The above-described components can be applied to components of a solid electrolytic capacitor as an example described below. The components of the solid electrolytic capacitor as the example described below can be changed based on the above description. The matters described below may be applied to the exemplary embodiment described above. The components of the solid electrolytic capacitor as the example described below include components that are not essential to the solid electrolytic capacitor according to the present disclosure and that may be eliminated. Each drawing described below is schematic and does not accurately reflect a shape and the number of an actual member.

First Exemplary Embodiment

A first exemplary embodiment of the present disclosure will be described. As illustrated in FIGS. 1-2B, solid electrolytic capacitor 10 according to the present exemplary embodiment includes a plurality of (five herein) capacitor elements 11, anode lead terminal 12, a cathode lead terminal (not illustrated), two junctions 16, and outer packaging resin 17. The cathode lead terminal is electrically connected to cathode part 11*b* described later.

The plurality of capacitor elements 11 each have anode part 11*a* and cathode part 11*b* The plurality of capacitor elements 11 are stacked on each other in a first direction D1 (an up-down direction in FIG. 1). Between anode part 11*a* and cathode part 11*b*, insulating part 11*c* is provided to electrically insulate the anode part and the cathode part. Stacked anode parts 11*a* have first surface S1 that is the outermost surface arranged at one side (upward in FIG. 1) in the first direction and second surface S2 that is the outermost surface arranged at the other side (downward in FIG. 1) in the first direction.

Anode lead terminal 12 is electrically connected to anode part 11*a* of capacitor element 11. Anode lead terminal 12 includes two arms 13 facing anode part 11*a*, and bridge part 14 connecting two arms 13 (see FIG. 2B). Bridge part 14 has one principal surface (lower surface in FIG. 2B) that is exposed to the outside of solid electrolytic capacitor 10, and that functions as an anode terminal. Anode lead terminal 12 may be made of copper or a copper alloy, for example. FIG. 1 does not illustrate bridge part 14.

Arm 13 of anode lead terminal 12 includes through-hole 13*a* in a part facing first surface S1 of anode part 11*a* (see FIG. 2B). Through-hole 13*a* is a circular hole passing through arm 13 in a thickness direction. Through-hole 13*a* is disposed at a position overlapping each junction 16. Through-hole 13*a* is not limited in shape to a circular form, and may be in any other shape.

Two junctions 16 join and electrically connect stacked anode parts 11*a*. Each junction 16 extends along first direction D1. Each junction 16 may extend from first surface S1 to second surface S2. Each junction 16 may be formed by laser welding in which a laser is irradiated to first surface S1 through through-hole 13*a*.

Figure 2A:
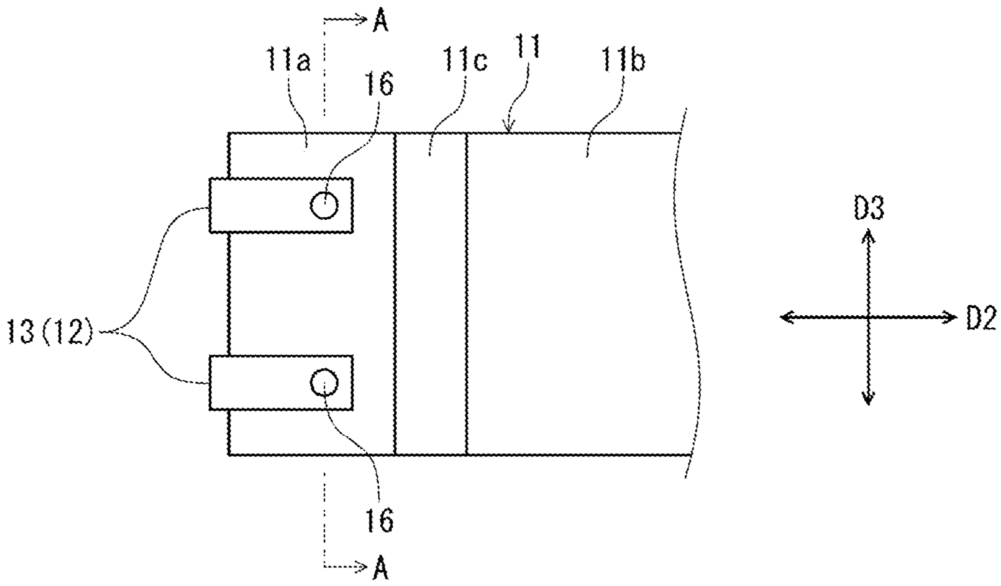
FIG. 2A is a plan view illustrating a capacitor element according to the first exemplary embodiment.
Figure 2B:
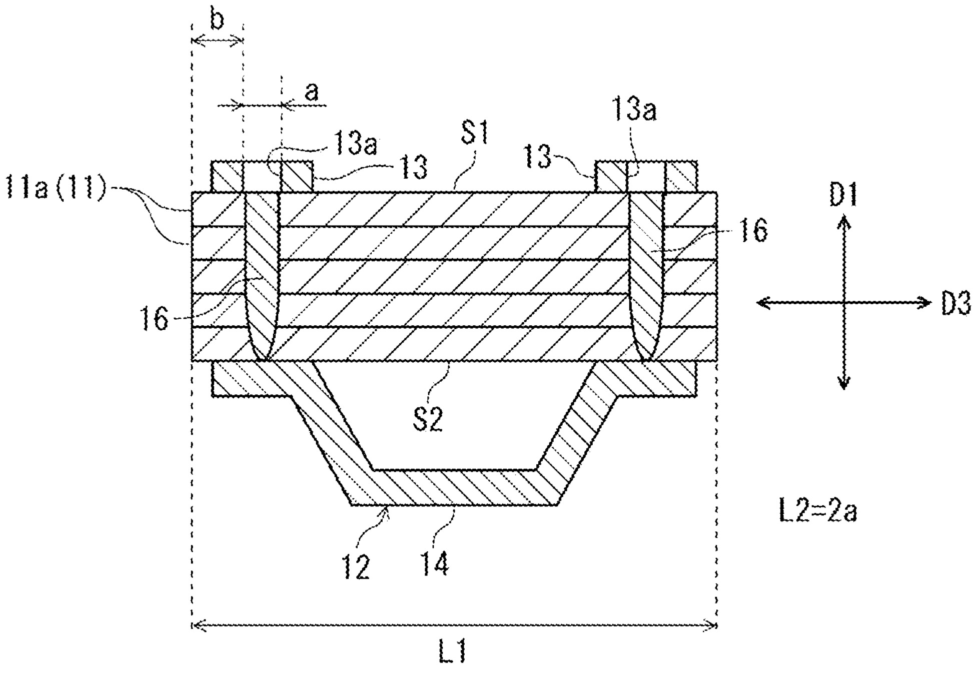
FIG. 2B is a sectional view taken along line A-A passing through the center of each junction in FIG. 2A.

A direction from anode part 11*a* to cathode part 11*b* is defined as second direction D2 (a right-left direction in FIG. 2A), and a direction perpendicular to each of second direction D2 and first direction D1 is defined as third direction D3 (an up-down direction in FIG. 2A). When anode part 11*a* has dimension L1 [mm] in third direction D3 and two junctions 16 have total dimension L2 [mm] of maximum diameters in third direction D3, a difference L1−L2 is less than or equal to 3.8 mm. The dimensional difference L1−L2 may range from 1.5 mm to 3.8 mm, inclusive, for example.

The dimension L1 of anode part 11*a* in third direction D3 is less than or equal to 4.3 mm. The dimension L1 may range from 2.5 mm to 4.3 mm, inclusive, for example. A maximum diameter of junction 16 closest to an end of anode part 11*a* in third direction D3 is less than or equal to 0.5 mm in third direction D3. The maximum diameter may range from 0.2 mm to 0.5 mm, inclusive, for example.

As illustrated in FIG. 2A, in second direction D2, the center of junction 16 is located closer to cathode part 11*b* than the center of anode part 11*a*. Here, one end of anode part 11*a* in second direction D2 is a left end of anode part 11*a* in FIG. 2A, another end of anode part 11*a* in second direction D2 is a boundary between anode part 11*a* and insulating part 11*c*, and the center of junction 16 in second direction D2 is an intermediate position between the one end and the another end.

In a predetermined cross section (cross section in FIG. 2B) perpendicular to second direction D2 of capacitor element 11, a relationship of "b≥a/2" is satisfied, where "a" [mm] represents a maximum diameter of junction 16 in third direction D3, and "b" [mm] represents a shortest distance between an end of anode part 11*a* and junction 16 in third direction D3. Here, the predetermined cross section passes through the center of junction 16. Maximum diameter "a" of junction 16 may be a diameter of junction 16 on first surface S1, for example.

Figure 3:
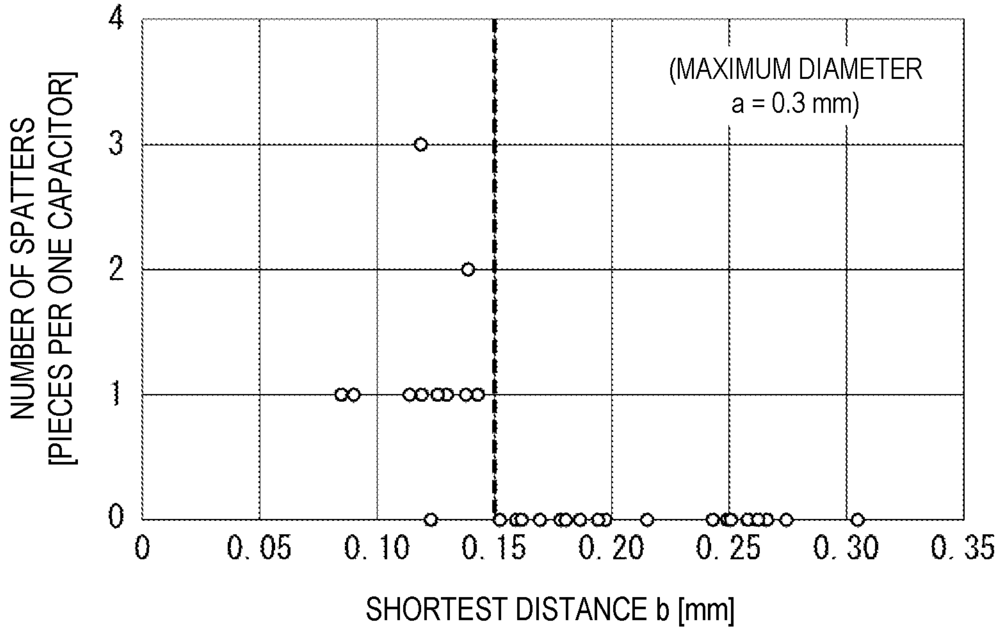
FIG. 3 is a graph showing a relationship between shortest distance b and the number of spatters when maximum diameter a is 0.3 mm.

FIG. 3 is a graph showing data on solid electrolytic capacitor 10 prepared by the inventors of the present application, the data being acquired the inventors. A horizontal axis of the graph shows shortest distance "b" [mm], and a vertical axis of the graph shows the number of sputters formed by solid electrolytic capacitor 10 [number/one capacitor]. The graph shows the data when a maximum diameter "a" of junction 16 in third direction D3 is 0.3 mm. As shown in the graph, when shortest distance "b" is less than 0.15 mm (i.e., when "b" is less than "a/2"), it is found that a spatter is generated to deteriorate joint quality. In contrast, when shortest distance "b" is more than or equal to 0.15 mm (i.e., when "b" is more than or equal to "a/2"), it is found that no spatter is generated to improve joint quality. In particular, when maximum diameter "a" above is less than or equal to 0.3 mm, formation of a spatter has a similar tendency regardless of maximum diameter "a" of junction 16.

Outer packaging resin 17 is configured to cover the plurality of capacitor elements 11 in a state where a part of each of anode lead terminal 12 and the cathode lead terminal is exposed to the outside. Outer packaging resin 17 may be made of an insulating resin material. Exposed parts of anode lead terminal 12 and the cathode lead terminal constitute respective external terminals of the solid electrolytic capacitor 10.

First Modification of First Exemplary Embodiment

A first modification of the first exemplary embodiment of the present disclosure will be described. Solid electrolytic capacitor 10 of the present modification is different from that of the first exemplary embodiment in configuration of anode lead terminal 12. Hereinafter, the difference from the first exemplary embodiment will be mainly described.

Figure 4A:
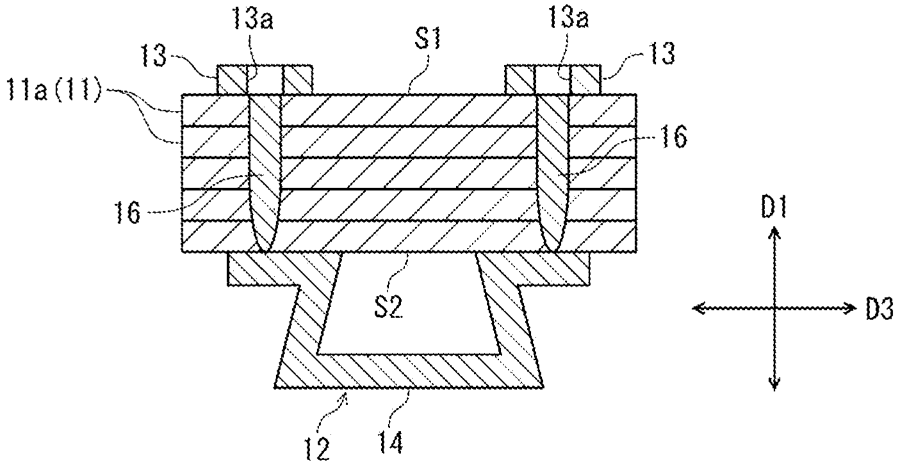
FIG. 4A is a diagram of a first modification of the first exemplary embodiment corresponding to FIG. 2B.

As illustrated in FIG. 4A, two arms 13 are provided apart from respective ends of anode part 11*a* in third direction D3. Bridge part 14 of anode lead terminal 12 includes a part that expands as a distance from the plurality of stacked capacitor elements 11 is increased.

Second Modification of First Exemplary Embodiment

A second modification of the first exemplary embodiment of the present disclosure will be described. Solid electrolytic capacitor 10 of the present modification is different from that of the first exemplary embodiment in configuration of anode lead terminal 12. Hereinafter, the difference from the first exemplary embodiment will be mainly described.

Figure 4B:
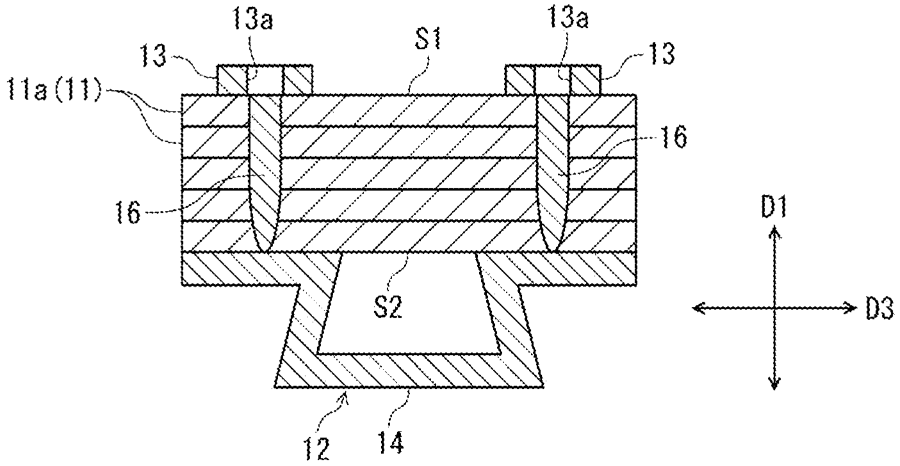
FIG. 4B is a diagram of a second modification of the first exemplary embodiment corresponding to FIG. 2B.

As illustrated in FIG. 4B, a part facing second surface S2 of two arms 13 extends to reach to an end of anode part 11*a* or to a vicinity of the end in third direction D3. Bridge part 14 of anode lead terminal 12 includes a part that expands as a distance from the plurality of stacked capacitor elements 11 is increased.

Third Modification of First Exemplary Embodiment

A third modification of the first exemplary embodiment of the present disclosure will be described. Solid electrolytic capacitor 10 of the present modification is different from that of the first exemplary embodiment in configuration of anode lead terminal 12. Hereinafter, the difference from the first exemplary embodiment will be mainly described.

Figure 4C:
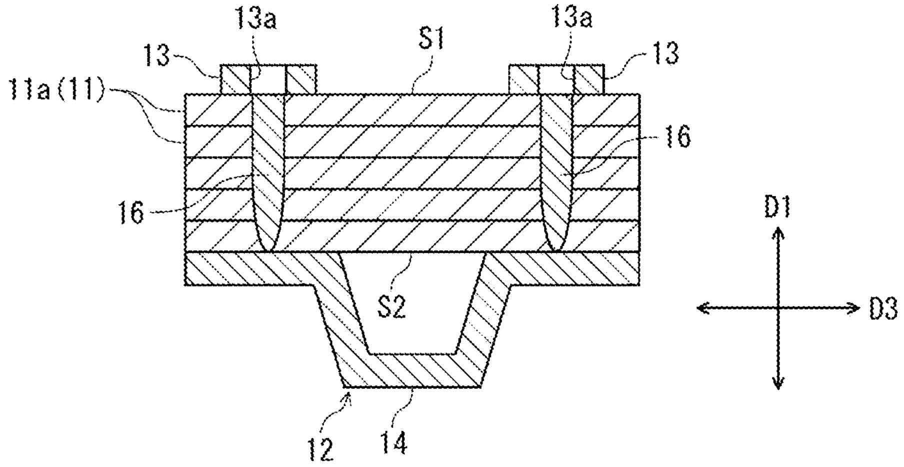
FIG. 4C is a diagram of a third modification of the first exemplary embodiment corresponding to FIG. 2B.

As illustrated in FIG. 4C, a part facing second surface S2 of two arms 13 extends to reach to an end of anode part 11*a* or to a vicinity of the end in third direction D3. Bridge part 14 of anode lead terminal 12 includes a part that narrows as a distance from the plurality of stacked capacitor elements 11 is increased.

Fourth Modification of First Exemplary Embodiment

A fourth modification of the first exemplary embodiment of the present disclosure will be described. Solid electrolytic capacitor 10 of the present modification is different from that of the first exemplary embodiment in including spacer 18. Hereinafter, the difference from the first exemplary embodiment will be mainly described.

Figure 5A:
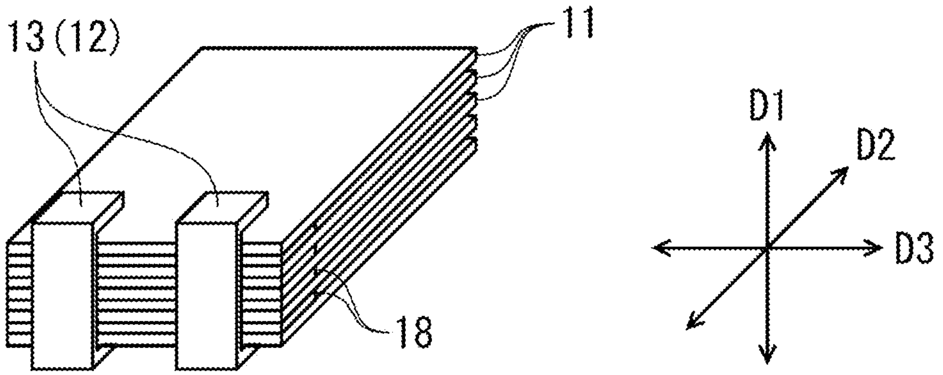
FIG. 5A is a perspective view illustrating a plurality of stacked capacitor elements corresponding to a fourth modification of the first exemplary embodiment.

As illustrated in FIG. 5A, solid electrolytic capacitor 10 includes a plurality of spacers 18 provided between corresponding anode parts 11*a* stacked on each other. Each spacer 18 defines a distance between adjacent anode parts 11*a* in first direction D1. Spacer 18 may be made of a conductive material (e.g., metal).

Fifth Modification of First Exemplary Embodiment

A fifth modification of the first exemplary embodiment of the present disclosure will be described. Solid electrolytic capacitor 10 of the present modification is different from that of the first exemplary embodiment in configuration of anode lead terminal 12. Hereinafter, the difference from the first exemplary embodiment will be mainly described.

Figure 5B:
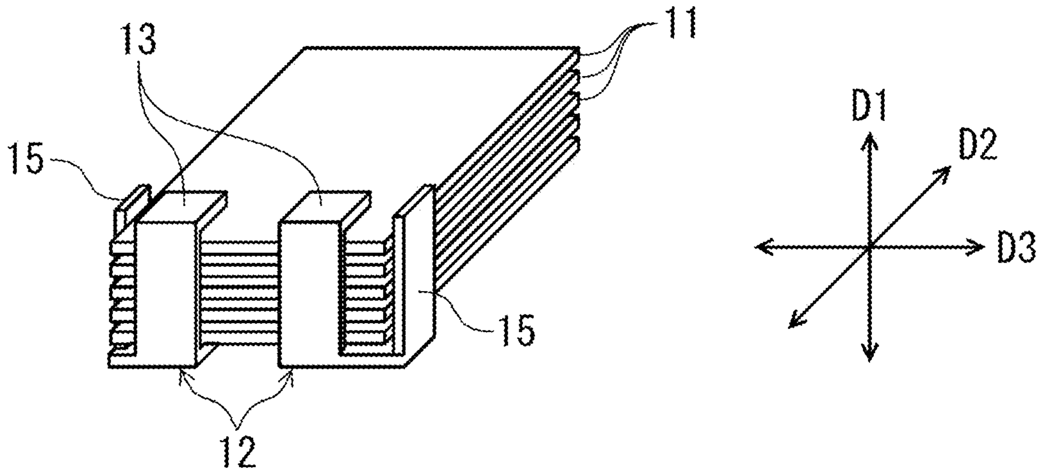
FIG. 5B is a perspective view illustrating a plurality of stacked capacitor elements corresponding to a fifth modification of the first exemplary embodiment.

As illustrated in FIG. 5B, anode lead terminal 12 includes side wall part 15 covering an edge part of anode part 11*a*, which extends along second direction D2. Side wall part 15 may be longer than an overall length of stacked anode parts 11*a* in first direction D1.

Sixth Modification of First Exemplary Embodiment

A sixth modification of the first exemplary embodiment of the present disclosure will be described. Solid electrolytic capacitor 10 of the present modification is different from that of the first exemplary embodiment in configuration of anode lead terminal 12. Hereinafter, the difference from the first exemplary embodiment will be mainly described.

Figure 5C:
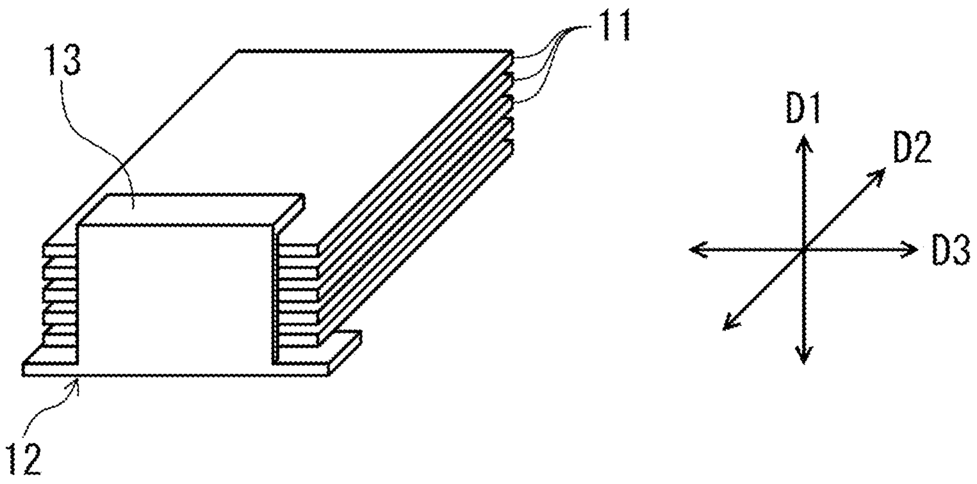
FIG. 5C is a perspective view illustrating a plurality of stacked capacitor elements corresponding to a sixth modification of the first exemplary embodiment.

As illustrated in FIG. 5C, anode lead terminal 12 includes only one arm 13. A length of arm 13 in third direction D3 is equal to or longer than half of dimension L1 of anode part 11*a*. In third direction D3, a length of arm 13 may range from 50% to 90%, inclusive, of dimension L1 of anode part 11*a*.

Seventh Modification of First Exemplary Embodiment

A seventh modification of the first exemplary embodiment of the present disclosure will be described. Solid electrolytic capacitor 10 according to the present modification is different from that of the first exemplary embodiment in having a so-called double-sided stacked structure. Hereinafter, the difference from the first exemplary embodiment will be mainly described.

Figure 5D:
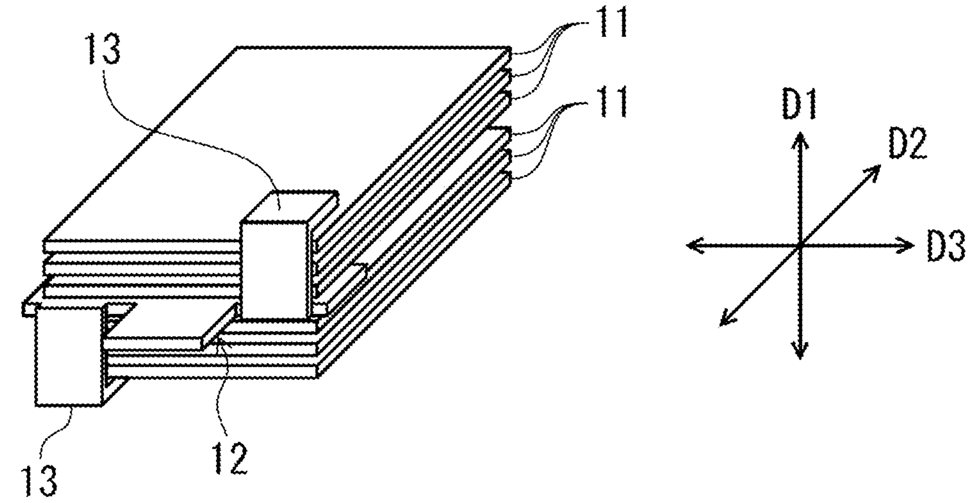
FIG. 5D is a perspective view illustrating a plurality of stacked capacitor elements corresponding to a seventh modification of the first exemplary embodiment.

The double-sided stacked structure refers to a structure in which capacitor elements 11 are stacked on both one principal surface and another principal surface of anode lead terminal 12. As illustrated in FIG. 5D, three capacitor elements 11 are stacked on the one (upper in FIG. 5D) principal surface of anode lead terminal 12, and three capacitor elements 11 are also stacked on the other principal surface of anode lead terminal 12.

Second Exemplary Embodiment

A second exemplary embodiment of the present disclosure will be described. Solid electrolytic capacitor 10 of the present exemplary embodiment is different from that of the first exemplary embodiment in including three junctions 16. Hereinafter, the difference from the first exemplary embodiment will be mainly described.

Figure 6A:
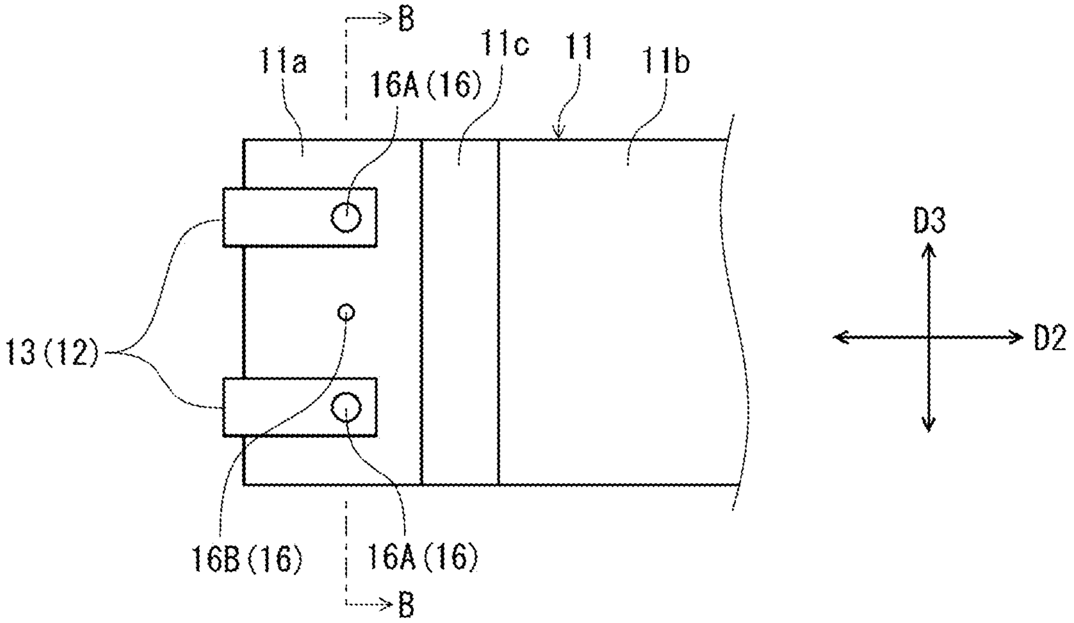
FIG. 6A is a plan view illustrating a capacitor element according to a second exemplary embodiment.
Figure 6B:
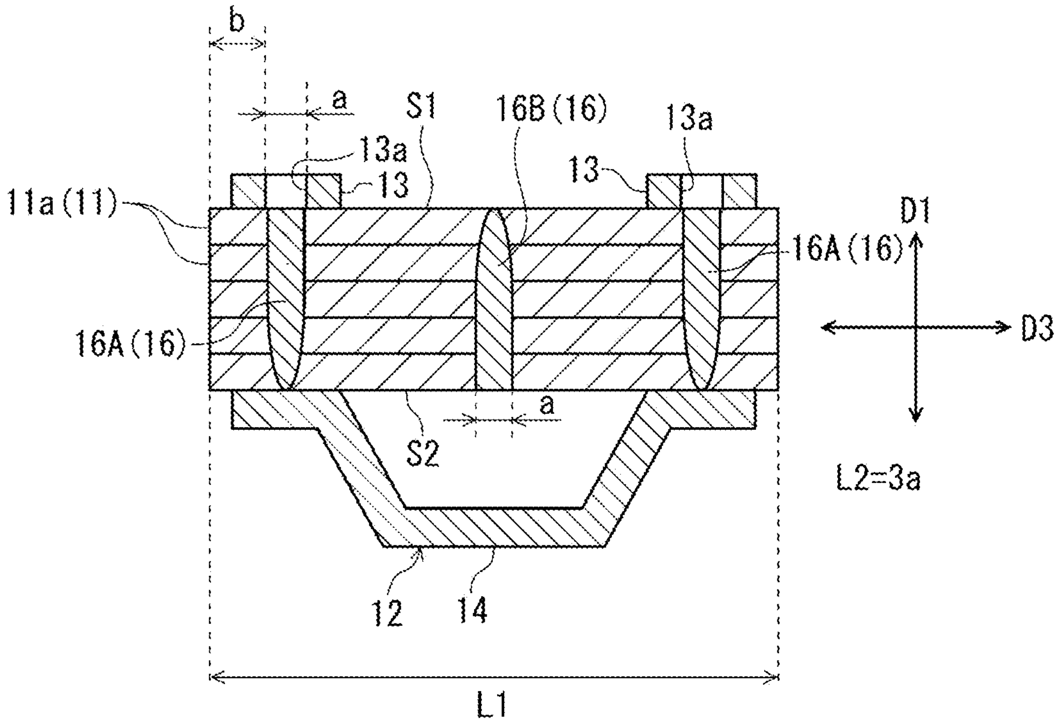
FIG. 6B is a sectional view taken along line B-B passing through the center of each junction in FIG. 6A.

As illustrated in FIGS. 6A-6B, solid electrolytic capacitor 10 includes three junctions 16. Three junctions 16 include two first junctions 16A each having a first area on first surface S1 and one second junction 16B having a second area smaller than the first area on first surface S1. Second junction 16B is disposed between two first junctions 16A. For example, first junction 16A may be formed by laser welding in which a laser is irradiated to first surface S1, and second junction 16B may be formed by laser welding in which a laser is irradiated to second surface S2.

Although the present invention has been described in terms of presently preferred exemplary embodiments, such disclosure should not be construed in a limiting manner. Various modifications and alterations will undoubtedly become apparent to those skilled in the art to which the present invention belongs upon reading the above disclosure. Thus, the appended scope of claims should be construed to cover all modifications and alterations without departing from the true spirit and scope of the present invention.

The present disclosure can be used for a solid electrolytic capacitor.

The invention claimed is:

1. A solid electrolytic capacitor comprising:

a plurality of capacitor elements each having an anode part and a cathode part, the plurality of capacitor elements being stacked in a first direction; and two or more junctions each joining and electrically connecting stacked anode parts including the anode part, each of the two or more junctions extending along the first direction, wherein:

$L1-L2 \leq 3.8$ mm is satisfied, where L1 [mm] represents a dimension of the anode part in a third direction perpendicular to each of the first direction and a second direction that is a direction from the anode part to the cathode part, and L2 [mm] represents a total dimension of maximum diameters of the two or more junctions in the third direction, $b \geq a/2$ is satisfied, where a [mm] represents a maximum diameter of each of the two or more junctions in the third direction in a predetermined cross section of the plurality of capacitor elements, the predetermined cross section being perpendicular to the second direction, and b [mm] represents a shortest distance between an end of the anode part and corresponding one of the two or more junctions in the third direction, in each of the plurality of capacitor elements, the anode part is a part of an anode body, and the cathode part is formed on a remaining part of the anode body, and a center of each of the two or more junctions is located closer to the cathode part than a center of the anode part in the second direction.

2. The solid electrolytic capacitor according to claim 1, wherein the dimension L1 of the anode part in the third direction is less than or equal to 4.3 mm.

3. The solid electrolytic capacitor according to claim 1, wherein a maximum diameter of a junction closest to the end of the anode part among the two or more junctions is less than or equal to 0.5 mm in the third direction.

4. The solid electrolytic capacitor according to claim 1, wherein the two or more junctions are two junctions.

5. The solid electrolytic capacitor according to claim 1, wherein:

the two or more junctions are three or more junctions, the stacked anode parts have a first surface and a second surface, the first surface being one of outermost surfaces arranged in the first direction, the second surface being another one of outermost surfaces arranged in the first direction, and the three or more junctions include a first junction and a second junction, the first junction having a first area on the first surface, the second junction having a second area smaller than the first area on the first surface.

6. A solid electrolytic capacitor comprising:

a plurality of capacitor elements each having an anode part and a cathode part, the plurality of capacitor elements being stacked in a first direction;

three or more junctions each joining and electrically connecting stacked anode parts including the anode part, each of the three or more junctions extending along the first direction;

an anode lead terminal connected to the anode part; and a cathode lead terminal connected to the cathode part, wherein:

$L1-L2 \leq 3.8$ mm is satisfied, where L1 [mm] represents a dimension of the anode part in a third direction perpendicular to each of the first direction and a second direction that is a direction from the anode part to the cathode part, and L2 [mm] represents a total dimension of maximum diameters of the three or more junctions in the third direction, and $b \geq a/2$ is satisfied, where a [mm] represents a maximum diameter of each of the three or more junctions in the third direction in a predetermined cross section of the plurality of capacitor elements, the predetermined cross section being perpendicular to the second direction, and b [mm] represents a shortest distance between an end of the anode part and corresponding one of the three or more junctions in the third direction, the anode lead terminal covers an end of the anode part in the second direction, the stacked anode parts have a first surface and a second surface, the first surface being one of outermost surfaces arranged in the first direction, the second surface being another one of outermost surfaces arranged in the first direction, and the three or more junctions include a first junction and a second junction, the first junction having a first area on the first surface, the second junction having a second area smaller than the first area on the first surface.

7. The solid electrolytic capacitor according to claim 6, wherein the dimension L1 of the anode part in the third direction is less than or equal to 4.3 mm.

8. The solid electrolytic capacitor according to claim 6, wherein a maximum diameter of a junction closest to the end of the anode part among the three or more junctions is less than or equal to 0.5 mm in the third direction.

9. The solid electrolytic capacitor according to claim 6, wherein a center of each of the three or more junctions is located closer to the cathode part than a center of the anode part in the second direction.

10. A solid electrolytic capacitor comprising:

a plurality of capacitor elements each having an anode part and a cathode part, the plurality of capacitor elements being stacked in a first direction; and two or more junctions each joining and electrically connecting stacked anode parts including the anode part, each of the two or more junctions extending along the first direction, wherein:

$L1-L2 \leq 3.8$ mm is satisfied, where L1 [mm] represents a dimension of the anode part in a third direction perpendicular to each of the first direction and a second direction that is a direction from the anode part to the cathode part, and L2 [mm] represents a total dimension of maximum diameters of the two or more junctions in the third direction, $b \geq a/2$ is satisfied, where a [mm] represents a maximum diameter of each of the two or more junctions in the third direction in a predetermined cross section of the plurality of capacitor elements, the predetermined cross section being perpendicular to the second direction, and b [mm] represents a shortest distance between an end of the anode part and corresponding one of the two or more junctions in the third direction, the stacked anode parts have a first surface and a second surface, the first surface being one of outermost surfaces arranged in the first direction, the second surface being another one of outermost surfaces arranged in the first direction, and the two or more junctions include a first junction and a second junction, the first junction having a first area on the first surface, the second junction having a second area smaller than the first area on the first surface.

11. The solid electrolytic capacitor according to claim 10, wherein the dimension L1 of the anode part in the third direction is less than or equal to 4.3 mm.

12. The solid electrolytic capacitor according to claim 10, wherein a maximum diameter of a junction closest to the end of the anode part among the two or more junctions is less than or equal to 0.5 mm in the third direction.

13. The solid electrolytic capacitor according to claim 10, wherein a center of each of the two or more junctions is located closer to the cathode part than a center of the anode part in the second direction.

14. The solid electrolytic capacitor according to claim 10, wherein the two or more junctions are two junctions.

15. The solid electrolytic capacitor according to claim 10, wherein the two or more junctions are three or more junctions.

* * * * *